(12) United States Patent
Brenner

(10) Patent No.: US 9,400,039 B2
(45) Date of Patent: Jul. 26, 2016

(54) CAMSHAFT ADJUSTER

(75) Inventor: Holger Brenner, Obermichelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 21 days.

(21) Appl. No.: 14/233,956

(22) PCT Filed: May 23, 2012

(86) PCT No.: PCT/EP2012/059533
§ 371 (c)(1),
(2), (4) Date: Jan. 21, 2014

(87) PCT Pub. No.: WO2013/029814
PCT Pub. Date: Mar. 7, 2013

(65) Prior Publication Data
US 2014/0144283 A1    May 29, 2014

(30) Foreign Application Priority Data
Sep. 1, 2011  (DE) .......................... 10 2011 081 974

(51) Int. Cl.
*F01L 1/34* (2006.01)
*F16H 25/10* (2006.01)
*F01L 1/344* (2006.01)

(52) U.S. Cl.
CPC .............. *F16H 25/10* (2013.01); *F01L 1/3442* (2013.01); *F01L 2001/34466* (2013.01); *F01L 2001/34469* (2013.01); *Y10T 74/2102* (2015.01)

(58) Field of Classification Search
CPC ................... F01L 1/3442; F01L 2001/34466; F01L 2001/34469
USPC ............................................ 123/90.15, 90.17
See application file for complete search history.

(56) References Cited

U.S. PATENT DOCUMENTS

| 6,779,499 B2 * | 8/2004 | Takenaka et al. .......... 123/90.17 |
| 7,089,898 B2 * | 8/2006 | Tsukada ............... F01L 1/3442 |
| | | 123/90.12 |
| 8,789,503 B2 * | 7/2014 | Kobayashi et al. ........ 123/90.17 |
| 2002/0139332 A1 | 10/2002 | Akihiko et al. |
| 2003/0121485 A1 | 7/2003 | Strauss |
| 2011/0168114 A1 | 7/2011 | Kobayashi |

FOREIGN PATENT DOCUMENTS

DE    10253496    9/2015

* cited by examiner

*Primary Examiner* — Ching Chang
(74) *Attorney, Agent, or Firm* — Davidson, Davidson & Kappel, LLC

(57) ABSTRACT

A camshaft adjuster (1) has a plurality of locking mechanisms (5) arranged on different pitch circles concentrically with respect to the axis of rotation (7) of the camshaft adjuster (1).

10 Claims, 3 Drawing Sheets

CAMSHAFT ADJUSTER

The present invention relates to a camshaft adjuster.

BACKGROUND

Camshaft adjusters are used in internal combustion engines to vary the control times of the combustion chamber valves to be able to vary the phase relation between the crankshaft and the camshaft in a defined angle range between a maximum early and a maximum late position. Adjusting the control times to the instantaneous load and rotational speed reduces consumption and emissions. For this purpose, camshaft adjusters are integrated into a drive train via which a torque is transferred from the crankshaft to the camshaft. This drive train may be designed, for example, as a belt, chain or gear drive.

In a hydraulic camshaft adjuster, the output element and the driving element form one or multiple pair(s) of counteracting pressure chambers to which a hydraulic medium is applied. The driving element and the output element are coaxially situated. A relative movement between the driving element and the output element is created by filling and emptying individual pressure chambers. The rotatively acting spring between the driving element and the output element pushes the driving element towards the output element in an advantageous direction. This advantageous direction may be in the same direction or the opposite direction of the direction of rotation.

One design of the hydraulic camshaft adjuster is the vane-type adjuster. Vane-type adjusters include a stator, a rotor and a drive wheel which has an external toothing. The rotor as the output element is usually designed to be rotatably fixedly connectable to the camshaft. The driving element includes the stator and the drive wheel. The stator and the drive wheel are rotatably fixedly connected to each other or, alternatively, they are designed to form a single piece with each other. The rotor is situated coaxially with respect to the stator and inside the stator. Together with their radially extending vanes, the rotor and stator form oppositely acting oil chambers to which oil pressure may be applied and which facilitate a relative rotation between the stator and the rotor. The vanes are either designed to form a single piece with the rotor or the stator or are situated as "plugged-in vanes" in grooves of the rotor or stator provided for this purpose. The vane-type adjusters furthermore have various sealing covers. The stator and the sealing covers are secured to each other with the aid of multiple screw connections.

Another design of the hydraulic camshaft adjuster is the axial piston adjuster. In this case, a shifting element, which creates a relative rotation between a driving element and an output element via inclined toothings, is axially shifted with the aid of oil pressure.

DE 102 53 496 A1 shows a camshaft adjuster which has two locking mechanisms. Each locking mechanism engages with its particular groove, and together they define a center position within the adjusting range of the camshaft adjuster.

SUMMARY OF THE INVENTION

It is an object of the present invention to provide a camshaft adjuster which has a space-saving arrangement of locking mechanisms.

The present invention provides a camshaft adjuster including a driving element and an output element; the driving element and the output element having multiple vanes; the vanes of the driving element and the output element sectioning off oppositely acting working chambers; it being possible to apply hydraulic medium to the working chambers for the purpose of achieving a relative rotation between the driving element and the output element; multiple locking mechanisms being provided, which are able to block or unblock the relative rotation between the driving element and the output element; each locking mechanism having a locking axis in whose direction the locking mechanism is locked or unlocked, characterized in that the locking axes (6) of the locking mechanisms have distances to the rotation axis of the camshaft adjuster which are different from each other.

This approach prevents one feed duct of one locking gate of a locking mechanism from overlapping with another feed duct of another locking gate of another locking mechanism during a relative rotation of the driving element with respect to the output element. As a result, different pressure levels for different locking mechanisms may be assigned to different locking mechanisms and may continue to be subject to a reliable, biunique assignment during operation of the camshaft adjuster. This is advantageous for standardizing the locking mechanisms or their components, in particular the locking springs and the locking pins. Due to the arrangement of the locking mechanisms, in which the distances of the particular locking axis to the rotation axis of the camshaft adjuster differ from each other, these locking mechanisms may be radially consecutively situated.

The locking mechanisms are situated in a receptacle of the driving element or the output element or on a component which is rotatably fixedly attached to one of these components, in particular a side cover. The receptacle is designed as a through-opening, in particular as a bore hole or as a blind hole, in particular as a blind bore hole.

According to the present invention, the different distances are understood in such a way that the direct distance between the particular locking axis to the rotation axis of the camshaft adjuster and the direct distance of another locking axis to the rotation axis of the camshaft adjuster are variably long or short. If no direct distance is ascertainable, e.g., if the locking axis intersects the rotation axis, the distance must be projected onto a sectional plane of the locking mechanism. The sectional planes must be provided essentially perpendicularly to the rotation axis of the camshaft adjuster, the point which defines the transition of the locking mechanism from the unlocked to the locked state being considered to ascertain the distance with the aid of the rotation axis.

In one embodiment of the present invention, the locking axes are situated in parallel to the rotation axis of the camshaft adjuster. The complexity in manufacturing the receptacles for the locking pin, locking spring, etc., of the locking mechanism is advantageously low. Parallel orientations of the locking axes are functionally preferred, since this avoids forces in the direction of the locking axes in the locked state which may cause uncontrolled unlocking.

The locking axes may be situated in a skewed manner in relation to the rotation axis of the camshaft adjuster. This more complex arrangement may advantageously make better use of the existing installation space.

In one embodiment of the present invention, the locking mechanisms have a rotationally symmetrical design. This locking mechanism, including its components, in particular the locking pin and the locking spring, are economical to manufacture and may rotate around their own axis (locking axis) in the receptacle of the locking mechanism for the purpose of distributing the wear to the circumference of the locking pin during locking. This increases the service life and reliability of the locking mechanism.

In one advantageous embodiment, the locking mechanisms each have one locking pin and one locking spring. A reduced part diversity and an increased production volume lower the costs of the individual components. Alternatively, one locking spring may be provided for multiple locking pins. Locking springs may be leaf springs, spiral springs, pressure springs, cup springs or other elastic elements. A locking gate, which is able to accommodate the locking pin in the locked state, is located opposite each locking pin. In the absence of hydraulic medium pressure, the locking spring pushes the locking pin into this locking gate. For this purpose, the locking spring may be supported by its end opposite the locking pin on the receptacle for the locking mechanism itself or on a separate component, in particular on a locking cartridge. If a hydraulic medium pressure acts upon the locking pin, the locking spring is tensioned, the locking pin leaves the locking gate and it changes to the unlocked state.

In one preferred embodiment, a locking mechanism defines, in its locked state, a relative angular position of the driving element with respect to the output element, in which the vanes which section off an oppositely acting pair of working chambers are spaced a distance apart. Another locking mechanism may advantageously define another relative angular position, which is different from the first angular position, e.g., a maximum "early" position or a maximum "late" position. In these extreme positions, two vanes almost come in contact with each other. A locking in the extreme positions secures the driving element with respect to the output element in the absence of hydraulic medium pressure in the working chambers, in particular when the engine starts. Ideally, the relative angular position, in which the vanes which section off an oppositely acting pair of working chambers are spaced a distance apart, is approximately the middle of the adjusting range of the camshaft adjuster.

In another preferred embodiment, multiple locking mechanisms define, in their locked states, a relative angular position of the driving element with respect to the output element, in which the vanes which section off an oppositely acting pair of working chambers are spaced a distance apart. This relative angular position is preferably approximately the middle of the adjusting range of the camshaft adjuster. Multiple locking mechanisms increase the reliability of the locking action in this angular position. If a locking mechanism is not able to engage with its corresponding locking gate, the other locking mechanism may be able to engage with its corresponding locking gate. The particular locking gate may be designed as a bore hole or as a groove. Hydraulic medium may be added under pressure to the locking mechanism via the locking gate, so that unlocking may take place.

In one embodiment of the present invention, the locking gates associated with the locking mechanisms are provided on separate components of the camshaft adjuster. The particular locking gate is designed as a material recess, as a bore hole or as a groove, preferably as a groove having a stepped depth. A hydraulic medium duct, with the aid of which hydraulic medium may be supplied to the locking gate, extends to the locking gate. A provision on different components is advantageous to keep the supply of hydraulic medium separate in an even more targeted manner and to increase the seal lengths between the hydraulic medium ducts. The separate components may ideally resemble each other, e.g., two side covers of a camshaft adjuster.

In another embodiment of the present invention, the locking gates associated with the locking mechanisms are provided on the same component of the camshaft adjuster. The particular locking gate is designed as a material recess, as a bore hole or as a groove, preferably as a groove having a stepped depth. A hydraulic medium duct, with the aid of which hydraulic medium may be supplied to the locking gate, extends to the locking gate. A provision on the same component reduces the manufacturing complexity and makes more efficient use of the existing installation space. Multiple functions may thus be preferably integrated into one component.

In another preferred embodiment of the present invention, the component is a side cover or the driving element of the camshaft adjuster, on which the locking gates associated with the locking mechanisms are provided. For this purpose, the locking mechanisms are situated on the output element.

In one advantageous embodiment, one locking mechanism is situated within a vane, and another locking mechanism is situated outside a vane, advantageously in the area of the hub of the output element. Other options for the placement of the other locking mechanism are, for example, the driving element, side cover, camshaft, etc. An arrangement of this type not only makes it possible to design the pitch circles of the locking mechanisms differently from each other but also to preferably variably situate the angular positions in relation to each other in the adjusting direction of the camshaft adjuster. This arrangement increases the seal lengths between the locking mechanisms and makes efficient use of the existing installation space. It is furthermore advantageous that only one vane has to have the installation space for a locking mechanism, while the remaining vanes may be given a very thin design, which increases the adjusting range of the camshaft adjuster.

Due to the arrangement of multiple locking mechanisms according to the present invention, an increased installation space efficiency is achieved for situating the feed ducts for activating the locking mechanisms.

BRIEF DESCRIPTION OF THE DRAWINGS

Exemplary embodiments of the present invention are illustrated in the figures.

DETAILED DESCRIPTION OF THE INVENTION

Figure 1:
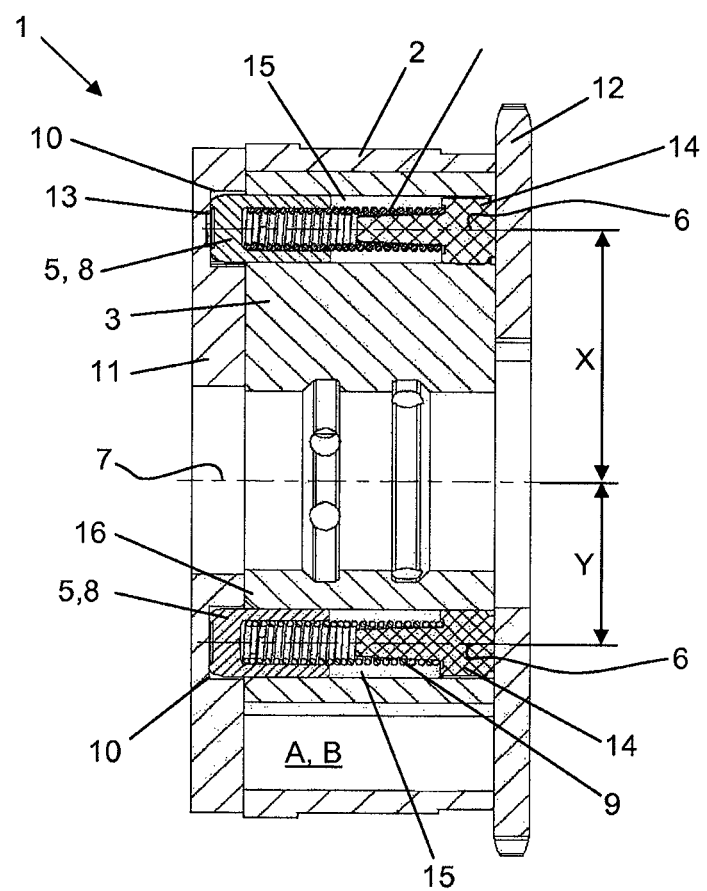
FIG. 1 shows a longitudinal sectional view of a camshaft adjuster according to the present invention.

FIG. 1 shows a longitudinal sectional view of a camshaft adjuster 1 according to the present invention. Camshaft adjuster 1 includes a driving element 2, an output element 3, a side cover 11 and a drive wheel 12, all of which have the same rotation axis 7 of camshaft adjuster 1. Driving element 2 is rotatably fixedly connected to drive wheel 12 and side cover 11. The drive wheel has a toothing on its outer diameter, which may be brought into engagement with a traction mechanism. Output element 3 is rotatably situated relative to driving element 2 within an angle range. As is known from the prior art, output element 3 and driving element 2 have multiple vanes 4 distributed on their circumference, which section off oppositely acting working chambers A and B, which, in turn, may be filled with hydraulic medium and emptied to allow a relative rotation of output element 3 to driving element 2 to take place.

Output element 3 has a hub 16, from which vanes 4 extend in the radial direction. A locking receptacle 15, which has a locking mechanism 5, is situated within this hub 16. Locking mechanism 5 includes a locking pin 8, a locking spring 9 and a locking cartridge 14. Locking receptacle 15 is designed as a through-bore. Locking spring 9 is under pretension and pushes locking pin 8 and locking cartridge 14 apart along locking axis 6. Locking pin 8 engages with a locking gate 10 provided for this purpose. Locking cartridge 14 is supported on a front side of drive wheel 12. Locking mechanism 5 has a rotationally symmetrical design, whereby locking axis 6 is the same as the axis of symmetry of the locking mechanism. In nonrotationally symmetrical locking mechanisms 5, locking axis 6 is the axis in whose direction locking pin 8 is pushed or moved for engagement with its locking gate 10.

Another locking receptacle 15, in which another locking mechanism 5 is accommodated, is provided within a vane 4 of output element 3. This additional locking mechanism 5 has the same design as locking mechanism 5 in hub 16 mentioned above. Locking gate 10 of locking mechanism 5 situated in vane 4 has a hydraulic medium duct 13 for filling this locking gate 10 with hydraulic medium, whereby its locking pin 8 is moved out of locking gate 10, along its locking axis 6 in the direction of its locking cartridge 14 and against the spring force of locking spring 9. Locking mechanism 5 is unlocked thereby. Aforementioned locking mechanism 5 situated in hub 16 is unlocked in the same way, as shown later on in FIG. 3.

According to the present invention, the two locking mechanisms 5, which have different distances X, Y from each other, are placed at a distance from rotation axis 7 of the camshaft adjuster. Due to the parallel arrangement of locking mechanisms 5 and their locking axes 6 with respect to rotation axis 7 and the rotation symmetry of locking mechanisms 5, each point on locking axis 6 forms an approximately constant distance X, Y to the rotation axis. The point which characterizes the transition of locking mechanism 5 from the unlocked state to the locked state is generally observed. In FIG. 1, this is specifically the point of intersection of particular locking axis 6 with the cross section of its locking gate 10 on the front side of side cover 11, which faces output element 3.

Figure 2:
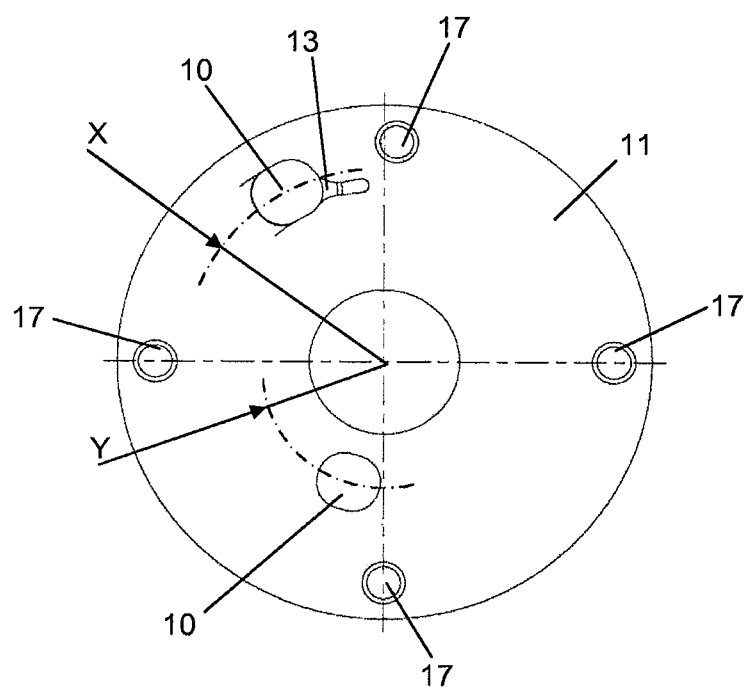
FIG. 2 shows the side cover of the camshaft adjuster according to FIG. 1.

FIG. 2 shows corresponding side cover 11 of camshaft adjuster 1 according to FIG. 1. Side cover 11 is designed as a circular disk having a central opening 18. Opening 18, as well as hub 16 of output element 3, may be penetrated by a central valve or a central screw. Side cover 11 furthermore has multiple attachment options to driving element 2, in this case in the form of bore holes 17 for attachment screws. The two locking gates 10, whose centers are situated on different pitch circles having distances X, Y, are clearly apparent. The one locking gate 10 has hydraulic medium duct 13 mentioned in FIG. 1 above, which extends into an adjacent working chamber A or B. Hydraulic medium is transported out of this working chamber A or B to locking gate 10 via hydraulic medium duct 13 with the aid of hydraulic medium pressure, and locking mechanism 5, which is situated in vane 4, may be unlocked.

Figure 3:
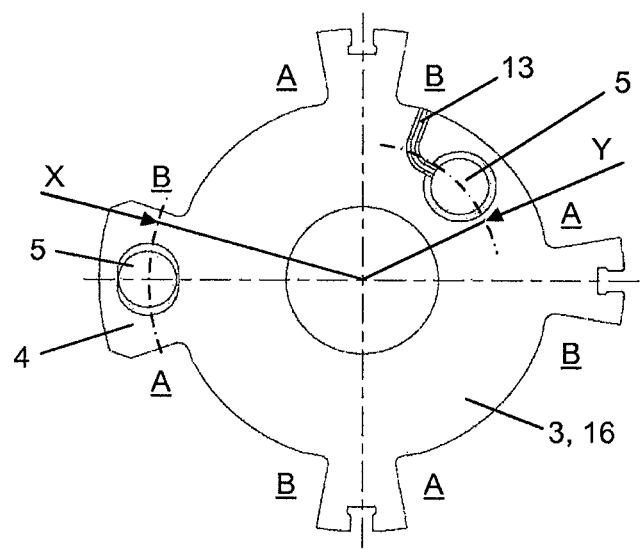
FIG. 3 shows the output element of the camshaft adjuster according to FIG. 1.

FIG. 3 shows corresponding output element 3 of camshaft adjuster 1 according to FIG. 1. Output element 3 has four vanes 4. Hub 16 has one opening 18. A locking mechanism 5 is situated a short distance Y away in the area of hub 16. A locking mechanism 5 is situated a greater distance X away in one of vanes 4. Vanes 4 section off oppositely acting working chambers A, B whose spatial delimitations are completed by driving element 2, side cover 11 and drive wheel 12. Hub-proximate locking mechanism 5 has a hydraulic medium duct 13 which extends to working chamber B. When this working chamber B is filled with hydraulic medium, hydraulic medium duct 13 transports this hydraulic medium to locking gate 10 of hub-proximate locking mechanism 5, which is unlocked thereby.

LIST OF REFERENCE NUMERALS/SYMBOLS

1) Camshaft adjuster
2) Driving element
3) Output element
4) Vane
5) Locking mechanism
6) Locking axis
7) Rotation axis
8) Locking pin
9) Locking spring
10) Locking gate
11) Side cover
12) Drive wheel
13) Hydraulic medium duct
14) Locking cartridge
15) Locking receptacle
16) Hub
17) Bore holes
18) Opening
A) Working chamber
B) Working chamber
X) Distance
Y) Distance

The invention claimed is:

1. A camshaft adjuster comprising:
a driving element;
an output element, the driving element and the output element having multiple vanes, the vanes of the driving element and the output element sectioning off oppositely acting working chambers, the working chambers pressurizable with a hydraulic medium for the purpose of achieving a relative rotation between the driving element and the output element; and
multiple locks for blocking or unblocking the relative rotation between the driving element and the output element, each lock having a locking axis, the lock being locked or unlocked in the direction of the locking axis, the locking axes of the locks having distances to a rotation axis of the camshaft adjuster different from each other; wherein the locking axes are situated in parallel to the rotation axis of the camshaft adjuster, the multiple locks being arranged in one of the driving element and the output element.

2. The camshaft adjuster as recited in claim 1 wherein the locks are rotationally symmetrical.

3. The camshaft adjuster as recited in claim 1 wherein the locks each have one locking pin and one locking spring.

4. The camshaft adjuster as recited in claim 1 wherein, in a locked state, one lock defines a relative angular position of the driving element to the output element, in which the vanes sectioning off one of the working chambers are spaced a distance apart.

5. The camshaft adjuster as recited in claim 1 wherein, in their locked states, multiple locks together define a relative angular position of the driving element to the output element, in which the vanes sectioning off one of the working chambers are spaced a distance apart.

6. The camshaft adjuster as recited in claim 1 further comprising locking gates associated with the locks on different components of the camshaft adjuster.

7. The camshaft adjuster as recited in claim 1 further comprising locking gates associated with the locks on a same component of the camshaft adjuster.

8. The camshaft adjuster as recited in claim 7 wherein the same component is a side cover or the driving element of the camshaft adjuster.

9. The camshaft adjuster as recited in claim 1 wherein one lock is situated within a vane and another lock is situated outside of the vane or another vane.

10. The camshaft adjuster as recited in claim 1 wherein the multiple locks are arranged in the output element.

* * * * *